United States Patent
Yoshioka et al.

(10) Patent No.: US 12,269,912 B2
(45) Date of Patent: Apr. 8, 2025

(54) FIBER-REINFORCED MOLDING MATERIAL AND MOLDED ARTICLE USING SAME

(71) Applicant: DIC Corporation, Tokyo (JP)

(72) Inventors: Chikara Yoshioka, Takaishi (JP); Kazutoshi Hitomi, Takaishi (JP)

(73) Assignee: DIC Corporation, Tokyo (JP)

( * ) Notice: Subject to any disclaimer, the term of this patent is extended or adjusted under 35 U.S.C. 154(b) by 689 days.

(21) Appl. No.: 17/608,192

(22) PCT Filed: May 1, 2020

(86) PCT No.: PCT/JP2020/018378
§ 371 (c)(1),
(2) Date: Nov. 2, 2021

(87) PCT Pub. No.: WO2020/230662
PCT Pub. Date: Nov. 19, 2020

(65) Prior Publication Data
US 2022/0227913 A1   Jul. 21, 2022

(30) Foreign Application Priority Data
May 16, 2019 (JP) .................. 2019-092878

(51) Int. Cl.
C08G 18/04 (2006.01)
C08J 5/04 (2006.01)
C08J 5/24 (2006.01)

(52) U.S. Cl.
CPC .............. *C08G 18/04* (2013.01); *C08J 5/042* (2013.01); *C08J 5/243* (2021.05); *C08J 2375/04* (2013.01)

(58) Field of Classification Search
CPC .................. C08G 18/04; C08J 2375/04
See application file for complete search history.

(56) References Cited

U.S. PATENT DOCUMENTS

2020/0071474 A1 * 3/2020 Fujita ................ C08J 5/042

FOREIGN PATENT DOCUMENTS

| EP | 3348603 A1 | 7/2018 | |
|---|---|---|---|
| EP | 3715405 A1 | 9/2020 | |
| EP | 3872111 A1 | 9/2021 | |
| JP | 2009-13306 A | 1/2009 | |
| WO | WO-2018070076 A1 * | 4/2018 | .............. B29B 7/90 |
| WO | 2020/213414 A1 | 10/2020 | |

OTHER PUBLICATIONS

Supplementary European Search Report mailed Nov. 7, 2022, issued for EP20805893.3.

* cited by examiner

*Primary Examiner* — Doris L Lee
(74) *Attorney, Agent, or Firm* — Troutman Pepper Locke LLP; James E. Armstrong, IV

(57) ABSTRACT

Provided is a fiber-reinforced molding material containing a thickening substance (A) containing a vinyl ester resin (a1), an unsaturated monomer (a2), a polyisocyanate (a3), and a polymerization initiator (a4) as essential raw materials and carbon fibers (B) with a fiber length of 2.5 mm to 50 mm. The thickening substance (A) satisfies conditions (1) to (3) below as measured with a rheometer. (1) The maximum value of the rate of change in viscosity in a temperature region lower than a temperature Xa indicating the lowest melt viscosity A is 100 Pa·s/° C. to 1,500 Pa·s/° C. (2) The maximum value of the rate of change in viscosity in a temperature region higher than or equal to the temperature Xa is 1,000 Pa·s/° C. to 10,000 Pa·s/° C. (3) The lowest melt viscosity A is 10 Pa·s to 1,000 Pa·s and the temperature Xa is 70° C. to 140° C.

4 Claims, No Drawings

FIBER-REINFORCED MOLDING MATERIAL AND MOLDED ARTICLE USING SAME

TECHNICAL FIELD

The present invention relates to a fiber-reinforced molding material and a molded article thereof.

BACKGROUND ART

Fiber-reinforced resin composite materials in which thermosetting resins such as epoxy resins and unsaturated polyester resins are reinforced with carbon fibers serving as reinforcing fibers have features, such as light weight, excellent heat resistance, and excellent mechanical strength, and are attracting attention and being increasingly used in various structural applications such as bodies or various components of automobiles and aircraft. In the fiber-reinforced resin composite materials, an autoclave method in which a material called prepreg is heated and cured in a pressurizable autoclave is known as a method for molding a material using an epoxy resin and a method for curing and molding an intermediate material called a sheet molding compound (SMC) or a bulk molding compound (BMC) by a technique such as press molding or injection molding is known as a method for molding a material using an unsaturated polyester resin. Particularly in recent years, materials excellent in productivity have been under active development.

For example, a carbon fiber-reinforced sheet-shaped molding material containing an unsaturated polyester resin, a vinyl monomer, a thermoplastic polymer, a polyisocyanate, a filler, conductive carbon black, and a wide carbon fiber bundle as essential components is known as such a molding material (refer to, for example, Patent Literature 1). However, this molding material has a problem that efficient press molding is difficult because the control of fluidity is insufficient.

CITATION LIST

Patent Literature

PTL 1: Japanese Unexamined Patent Application Publication No. 2009-13306

SUMMARY OF INVENTION

Technical Problem

A problem to be resolved by the present invention is to provide a fiber-reinforced molding material which is excellent in fluidity and which is useful in obtaining molded articles excellent in various physical properties such as flexural strength and a molded article thereof.

Solution to Problem

The inventors have found that a fiber-reinforced molding material containing a specific thickening substance and carbon fibers is excellent in fluidity during molding and is useful in obtaining a molded article excellent in various physical properties such as flexural strength, thereby completing the present invention.

That is, the present invention relates to a fiber-reinforced molding material and a molded article using the same. The fiber-reinforced molding material contains a thickening substance (A) containing a vinyl ester resin (a1), an unsaturated monomer (a2), a polyisocyanate (a3), and a polymerization initiator (a4) as essential raw materials and also contains carbon fibers (B) with a fiber length of 2.5 mm to 50 mm. The thickening substance (A) satisfies conditions (1) to (3) below as measured with a rheometer.

(1) The maximum value of the rate of change in viscosity in a temperature region lower than a temperature Xa indicating the lowest melt viscosity A is 100 to 1,500 (Pa·s/° C.).

(2) The maximum value of the rate of change in viscosity in a temperature region higher than or equal to the temperature Xa is 8,000 to 100,000 (Pa·s/° C.).

(3) The lowest melt viscosity A is 10 Pa·s to 1,000 Pa·s and the temperature Xa is 100° C. to 140° C.

Advantageous Effects of Invention

A molded article obtained from a fiber-reinforced molding material according to the present invention is excellent in flexural strength, flexural modulus, and the like and therefore can be satisfactorily used for automotive components, railway vehicle components, aerospace plane components, ship components, housing equipment components, sport components, light-vehicle components, building and civil engineering components, housings of OA devices, and the like.

DESCRIPTION OF EMBODIMENTS

A fiber-reinforced molding material according to the present invention contains a thickening substance (A) containing a vinyl ester resin (a1), an unsaturated monomer (a2), a polyisocyanate (a3), and a polymerization initiator (a4) as essential raw materials and also contains carbon fibers (B) with a fiber length of 2.5 mm to 50 mm. The thickening substance (A) satisfies conditions (1) to (3) below as measured with a rheometer.

(1) The maximum value of the rate of change in viscosity in a temperature region lower than a temperature Xa indicating the lowest melt viscosity A is 100 to 1,500 (Pa·s/° C.).

(2) The maximum value of the rate of change in viscosity in a temperature region higher than or equal to the temperature Xa is 1,000 Pa·s/° C. to 10,000 Pa·s/° C.

(3) The lowest melt viscosity A is 10 Pa·s to 1,000 Pa·s and the temperature Xa is 70° C. to 140° C.

The thickening substance (A) is one obtained by B-staging a composition containing the vinyl ester resin (a1), the unsaturated monomer (a2), the polyisocyanate (a3), and the polymerization initiator (a4) as essential raw materials.

The vinyl ester resin (a1) is obtained by the reaction of an epoxy resin with (meth)acrylic acid. The reaction is preferably carried out such that the molar ratio (COOH/EP) of carboxy groups of the (meth)acrylic acid to epoxy groups of the epoxy resin is in the range of 0.6 to 1.1 because the balance between fluidity and handleability such as film separability or tackiness during molding is excellent. From this viewpoint, the epoxy equivalent of the epoxy resin is preferably in the range of 180 to 370 and more preferably in the range of 180 to 250.

In the present invention, the term "(meth)acrylic acid" refers to one or both of acrylic acid and methacrylic acid and the term "(meth)acrylate" refers to one or both of an acrylate and a methacrylate.

Examples of the epoxy resin include bisphenol epoxy resins such as bisphenol A epoxy resins, bisphenol F epoxy resins, bisphenol fluorene epoxy resins, and biscresol fluorene; novolac epoxy resins such as phenol novolac epoxy resins and cresol novolac epoxy resins; oxazolidone-modified epoxy resins; phenol glycidyl ethers such as brominated epoxy resins of these resins; polyol glycidyl ethers such as dipropylene glycol diglycidyl ether, trimethylolpropane diglycidyl ether, diglycidyl ethers of bisphenol A-alkylene oxide adducts, and diglycidyl ethers of hydrogenated bisphenol A; alicyclic epoxy resins such as 3,4-epoxy-6-methylcyclohexylmethyl-3,4-epoxy-6-methylcyclohexanecarboxylate and 1-epoxyethyl-3,4-epoxycyclohexane; glycidyl esters such as phthalic acid diglycidyl ester, tetrahydrophthalic acid diglycidyl ester, diglycidyl-p-oxybenzoic acid, and dimer acid glycidyl ester; glycidyl amines such as tetraglycidyl diaminodiphenylmethane, tetraglycidyl-m-xylenediamine, triglycidyl-p-aminophenol, and N,N-diglycidylaniline; and heterocyclic epoxy resins such as 1,3-diglycidyl-5,5-dimethylhydantoin and triglycidyl isocyanurate. Among these, difunctional aromatic epoxy resins are preferable and bisphenol A epoxy resins and bisphenol F epoxy resins are more preferable because the strength of a molded article, the handleability of a molding material, and the fluidity of the molding material during molding are more excellent. These epoxy resins may be used alone or in combination.

The epoxy resin may be used in such a manner that the epoxy resin is polymerized with a dibasic acid such as bisphenol A for the purpose of adjusting the epoxy equivalent.

The reaction of the epoxy resin with (meth)acrylic acid is preferably carried out at 60° C. to 140° C. using an esterification catalyst. Furthermore, a polymerization inhibitor and the like may be used.

Examples of the unsaturated monomer (a2) include monofunctional (meth)acrylate compounds such as benzyl (meth)acrylate, phenoxyethyl (meth)acrylate, phenoxypolyethylene glycol (meth)acrylate, polyethylene glycol (meth)acrylate alkyl ethers, polypropylene glycol (meth)acrylate alkyl ethers, 2-ethylhexyl methacrylate, isodecyl (meth)acrylate, lauryl (meth)acrylate, isotridecyl (meth)acrylate, n-stearyl (meth)acrylate, tetrahydrofurfuryl methacrylate, isobornyl (meth)acrylate, dicyclopentenyloxyethyl (meth)acrylate, and dicyclopentanyl methacrylate; di(meth)acrylate compounds such as ethylene glycol di(meth)acrylate, propylene glycol di(meth)acrylate, 1,4-butanediol di(meth)acrylate, 1,3-butanediol di(meth)acrylate, neopentyl glycol di(meth)acrylate, 1,6-hexanediol di(meth)acrylate, bisphenol di(meth)acrylate, and 1,4-cyclohexanedimethanol di(meth)acrylate; diallyl phthalate; divinylbenzene; and styrene. Among these, unsaturated monomers containing an aromatic are preferable and benzyl methacrylate and phenoxyethyl methacrylate are more preferable because a molding material with higher strength is obtained. These unsaturated monomers may be used alone or in combination.

The mass ratio ((A)/(B)) of the vinyl ester resin (a1) to the unsaturated monomer (a2) is preferably in the range of 40/60 to 85/15 and more preferably in the range of 50/50 to 70/30 because the balance between the impregnation of the carbon fibers with resin, handleability, and curability further improves.

The viscosity of a mixture of the vinyl ester resin (A) and the unsaturated monomer (B) is preferably in the range of 200 mPa·s to 8,000 mPa·s (25° C.) because the impregnation of the carbon fibers with resin further improves.

Examples of polyisocyanates (C) that can be used include aromatic polyisocyanates such as diphenylmethane diisocyanate (the 4,4'-isomer, the 2,4'-isomer, the 2,2'-isomer, or a mixture thereof), modified products of diphenylmethane diisocyanate, such as carbodiimide modified products, nurate modified products, biuret modified products, and urethane imine modified products of diphenylmethane diisocyanate and polyol modified products obtained by modifying diphenylmethane diisocyanate with a polyol, such as diethylene glycol or dipropylene glycol, having a number-average molecular weight of 1,000 or less, tolylene diisocyanate, tolidine diisocyanate, polymethylene polyphenyl polyisocyanate, xylylene diisocyanate, 1,5-naphthalene diisocyanate, and tetramethylxylene diisocyanate; alicyclic polyisocyanates such as isophorone diisocyanate, hydrogenated diphenylmethane diisocyanate, hydrogenated xylylene diisocyanate, and norbornene diisocyanate; and aliphatic polyisocyanates such as hexamethylene diisocyanate, nurate modified products, biuret modified products, and adducts of hexamethylene diisocyanate, and dimer acid diisocyanate. Among these, aromatic polyisocyanates are preferable because a molding material excellent in handleability (film separability or tackiness) is obtained. These polyisocyanates (C) may be used alone or in combination.

The molar ratio (NCO/OH) of isocyanate groups (NCO) of the polyisocyanate (C) to hydroxy groups (OH) of the vinyl ester resin (A) is preferably in the range of 0.5 to 0.95 and more preferably 0.55 to 0.85 because the melt viscosity can be readily controlled.

The polymerization initiator (a4) is not particularly limited and is preferably an organic peroxide. Examples of the polymerization initiator (a4) include diacyl peroxide compounds, peroxyester compounds, hydroperoxide compounds, ketone peroxide compounds, alkyl perester compounds, percarbonate compounds, and peroxyketals. The polymerization initiator (a4) can be appropriately selected depending on molding conditions. These polymerization initiators (a4) may be used alone or in combination.

Among these, a polymerization initiator whose temperature for obtaining 10-hour half-life is 70° C. to 110° C. is preferably used for the purpose of reducing the molding time. The temperature is preferably 70° C. to 100° C. because the life of the fiber-reinforced molding material at room temperature is long and the fiber-reinforced molding material can be cured by heating in a short time, and the balance between curability and moldability is more excellent. Examples of such a polymerization initiator include 1,6-bis(t-butylperoxycarbonyloxy)hexane, 1,1-bis(t-butylperoxy)cyclohexane, 1,1-bis(t-amylperoxy)cyclohexane, 1,1-bis(t-hexylperoxy)cyclohexane, t-butyl peroxydiethylacetate, t-butyl peroxyisopropylcarbonate, t-amyl peroxyisopropylcarbonate, t-hexyl peroxyisopropylcarbonate, di-tert-butyl peroxyhexahydroterephthalate, and t-amyl peroxytrimethylhexanoate.

The content of the polymerization initiator (a4) is preferably in the range of 0.3% by mass to 3% by mass with respect to the sum of the amounts of the vinyl ester resin (a1) and the unsaturated monomer (a2) because curing properties and storage stability are both excellent.

As the raw materials of the thickening substance (A), materials other than the vinyl ester resin (a1), the unsaturated monomer (a2), the polyisocyanate (a3), and the polymerization initiator (a4) may also be used. The thickening substance (A) may contain, for example, a thermosetting resin other than the vinyl ester resin (a1), a thermoplastic resin, a polymerization inhibitor, a curing accelerator, a filler, a low profile additive, a release agent, a thickening agent, a viscosity depressant, a pigment, an oxidation inhibitor, a plasticizer, a flame retardant, an antibacterial agent, an ultraviolet stabilizer, a reinforcer, a photocuring agent, and the like.

Examples of the thermosetting resin include vinyl urethane resins, unsaturated polyester resins, acrylic resins, epoxy resins, phenol resins, melamine resins, and furan resins. These thermosetting resins may be used alone or in combination.

Examples of the thermoplastic resin include polyamide resins, polyethylene terephthalate resins, polybutylene terephthalate resins, polycarbonate resins, urethane resins, polypropylene resins, polyethylene resins, polystyrene resins, acrylic resins, polybutadiene resins, polyisoprene resins, and those obtained by modifying these by polymerization or the like. These thermoplastic resins may be used alone or in combination.

Examples of the polymerization inhibitor include hydroquinone, trimethylhydroquinone, p-t-butylcatechol, t-butylhydroquinone, toluhydroquinone, p-benzoquinone, naphthoquinone, hydroquinone monomethyl ether, phenothiazine, copper naphthenate, and copper chloride. These polymerization inhibitors may be used alone or in combination.

Examples of the curing accelerator include metal soaps such as cobalt naphthenate, cobalt octenoate, vanadyl octenoate, copper naphthenate, and barium naphthenate; metal chelate compounds such as vanadyl acetylacetate, cobalt acetylacetate, and iron acetylacetate; and amines such as N,N-dimethylamino-p-benzaldehyde, N,N-dimethylaniline, N,N-diethylaniline, N,N-dimethyl-p-toluidine, N-ethyl-m-toluidine, triethanolamine, m-toluidine, diethylenetriamine, pyridine, phenylmorpholine, piperidine, and diethanolaniline. These curing accelerators may be used alone or in combination.

The filler is an inorganic compound or an organic compound and can be used to adjust physical properties, such as strength, elastic modulus, impact strength, fatigue durability, and the like, of a molded article.

Examples of the inorganic compound include calcium carbonate, magnesium carbonate, barium sulfate, mica, talc, kaolin, clay, celite, asbestos, barite, baryta, silica, silica sand, dolomite limestone, gypsum, a fine aluminum powder, hollow balloon, alumina, a glass powder, aluminum hydroxide, white marble, zirconium oxide, antimony trioxide, titanium oxide, molybdenum dioxide, and an iron powder.

Examples of the organic compound include powders of natural polysaccharides such as cellulose and chitin and synthetic resin powders. The synthetic resin powders used may be powders of organic materials such as hard resins, soft rubber, elastomers, or polymers (copolymers) or particles having a multilayer structure such as a core-shell structure. Specific examples thereof include particles made of butadiene rubber and/or acrylic rubber, urethane rubber, silicone rubber, or the like; polyimide resin powders; fluorocarbon resin powders, and phenolic resin powders. These fillers may be used alone or in combination.

Examples of the release agent include zinc stearate, calcium stearate, paraffin wax, polyethylene wax, and carnauba wax. Paraffin wax, polyethylene wax, and carnauba wax are preferable. These release agents may be used alone or in combination.

Examples of the thickening agent include metal oxides and metal hydroxides such as magnesium oxide, magnesium hydroxide, calcium oxide, and calcium hydroxide and also include acrylic resin-based fine particles. The thickening agent can be appropriately selected depending on the handleability of the fiber-reinforced molding material according to the present invention. These thickening agents may be used alone or in combination.

The thickening substance (A) is obtained by mixing the vinyl ester resin (a1), the unsaturated monomer (a2), the polyisocyanate (a3), the polymerization initiator (a4), and other ingredients as required and aging the mixture. For example, the thickening substance (A) is obtained by performing aging at a temperature of 10° C. to 60° C. for two hours to 48 hours.

In order to allow the fiber-reinforced molding material to exhibit excellent fluidity, it is important for the thickening substance (A) that the maximum value of the rate of change in viscosity in a temperature region lower than the temperature Xa, which indicates the lowest melt viscosity A, be 100 Pa·s/° C. to 1,500 Pa·s/° C. as measured with a rheometer and it is preferable that the maximum value thereof be 100 Pa·s/° C. to 1,300 Pa·s/° C. It is important that the maximum value of the rate of change in viscosity in the temperature region higher than or equal to the temperature Xa be 1,000 Pa·s/° C. to 10,000 Pa·s/° C. and it is preferable that the maximum value thereof be 2,000 Pa·s/° C. to 9,000 Pa·s/° C.

In order to allow the fiber-reinforced molding material to exhibit excellent fluidity, it is important for the thickening substance (A) that the lowest melt viscosity A be 10 Pa·s to 1,000 Pa·s and it is preferable that the lowest melt viscosity A be 10 Pa·s to 900 Pa·s.

In order to allow the fiber-reinforced molding material to exhibit excellent fluidity, it is important for the thickening substance (A) that the temperature Xa be 70° C. to 140° C. and it is preferable that the temperature Xa be 80° C. to 130° C.

In order to allow the fiber-reinforced molding material to exhibit excellent fluidity, the maximum value of the loss tangent (Tan δ) of the thickening substance (A) in the temperature region lower than the temperature Xa is preferably 0.9 to 10 and more preferably 1 to 5.

In the present invention, the value of viscoelasticity such as lowest melt viscosity is one measured with a rheometer under conditions including a heating rate of 2° C./min. In particular, the value is one measured with a rheometer ("MCR 302" manufactured by Anton Paar GmbH) under the following conditions: a 30 mmφ parallel plate, an angular frequency of 10 rad/s, a swing angle of 10%, a heating rate of 2° C./min, and a gap of 1.5 mm.

The carbon fibers (B) used are carbon fibers cut to a length of 2.5 mm to 50 mm and are more preferably carbon fibers cut to a length of 5 mm to 40 mm because the fluidity in a mold during molding, the appearance of a molded article, and mechanical properties thereof further improve.

The carbon fibers (B) used may be, for example, various carbon fibers such as polyacrylonitrile-based, pitch-based, and rayon-based carbon fibers. Among these, polyacrylonitrile-based carbon fibers are preferable because high-strength carbon fibers can be readily obtained.

The number of filaments in a fiber bundle used as the carbon fibers (B) is preferably 1,000 to 60,000 because resin impregnation and mechanical properties of a molded article further improve.

The content of the carbon fibers (B) in the components of the fiber-reinforced molding material according to the present invention is preferably in the range of 20% by mass to 80% by mass and more preferably in the range of 40% by mass to 70% by mass because mechanical properties of a molded article that is obtained further improve. When the carbon fiber content is low, no high-strength molded article may possibly be obtained. When the carbon fiber content is high, the impregnation of the fibers with resin is insufficient, swelling occurs in a molded article, and no high-strength molded article may possibly be obtained.

The carbon fibers (B) in the fiber-reinforced molding material according to the present invention are impregnated with resin in such a state that the direction of the fibers is random.

The fiber-reinforced molding material according to the present invention contains the thickening substance (A) and the carbon fibers (B) and is preferably a sheet molding compound (hereinafter simply referred to as the "SMC") or a bulk molding compound (hereinafter simply referred to as the "BMC") from the viewpoint of excellent productivity and the viewpoint of moldability with design diversity.

An example of a method for manufacturing the SMC is a method in which components such as the vinyl ester resin (a1), the unsaturated monomer (a2), the polyisocyanate (a3), and the polymerization initiator (a4) are mixed and dispersed using a mixing machine such as an ordinary mixer, an intermixer, a planetary mixer, a roll, a kneader, or an extruder; the obtained resin composition is applied to vertically placed carrier films so as to give a uniform thickness; the carbon fibers (B) are interposed between portions of the resin composition that are located on the vertically placed carrier films; and the whole is fed between impregnation rolls and is pressurized such that the carbon fibers (B) are impregnated with the resin composition, followed by winding in a roll or folding in a zigzag fashion or the like. Furthermore, aging is preferably performed thereafter at a temperature of 10° C. to 60° C. for two hours to 48 hours.

The carrier films used may be polyethylene films, polypropylene films, laminated films of polyethylene and polypropylene, polyethylene terephthalate, nylon, or the like.

An example of a method for manufacturing the BMC is a method in which components such as the vinyl ester resin (a1), the unsaturated monomer (a2), the polyisocyanate (a3), and the polymerization initiator (a4) are mixed and dispersed using a mixing machine such as an ordinary mixer, an intermixer, a planetary mixer, a roll, a kneader, or an extruder, as in the method for manufacturing the SMC, and the carbon fibers (B) are mixed and dispersed in the obtained resin composition. Furthermore, aging is preferably performed thereafter in the same manner as that used to manufacture the SMC.

A molded article according to the present invention is obtained from the fiber-reinforced molding material. The molding method is preferably hot compression molding of the SMC or the BMC from the viewpoint of excellent productivity and the viewpoint of excellent design diversity.

For the hot compression molding, for example, a manufacturing method is used in which a predetermined amount of a molding material such as the SMC or the BMC is weighed and is charged into a mold heated to 110° C. to 180° C. in advance, the mold is clamped with a compression molding machine such that the molding material is shaped, the molding material is cured in such a manner that a molding pressure of 0.1 MPa to 30 MPa is held, and the molded article is then taken out, whereby the molded article is obtained. Detailed molding conditions are preferably such molding conditions that a molding pressure of 1 MPa to 15 MPa is held for one minute to five minutes per 1 mm of the thickness of the molded article at a mold temperature of 120° C. to 160° C. in a mold. Such molding conditions that a molding pressure of 1 MPa to 15 MPa is held for one minute to three minutes per 1 mm of the thickness of the molded article at a mold temperature of 140° C. to 160° C. in the mold are more preferable because productivity further improves.

A molded article obtained from the fiber-reinforced molding material according to the present invention is excellent in appearance, flexural strength, flexural modulus, and the like and therefore can be satisfactorily used for automotive components, railway vehicle components, aerospace plane components, ship components, housing equipment components, sport components, light-vehicle components, building and civil engineering components, housings of OA devices, and the like.

EXAMPLES

The present invention is further described below in detail with reference to specific examples. As the hydroxyl value, the number of milligrams of potassium hydroxide (mgKOH/g) required to neutralize acetic acid produced when 1 g of a resin sample was allowed to react with an acetylating agent at a specified temperature for a specified time on the basis of a method specified in JIS K-0070 was measured.

Synthesis Example 1: Synthesis of Vinyl Ester Resin (a1-1)

Into a 2 L flask equipped with a thermometer, a nitrogen inlet tube, and a stirrer, 725 parts by mass of an epoxy resin ("EPICLON 860" produced by DIC Corporation, a bisphenol A epoxy resin, an epoxy equivalent of 220), 284 parts by mass of methacrylic acid, and 0.28 parts by mass of t-butylhydroquinone were charged, followed by heating to 90° C. under a flow of gas obtained by mixing nitrogen and air at a ratio of 1:1. Hereinto, 0.60 parts by mass of 2-methylimidazole was put, followed by heating to 110° C. and reaction for 10 hours. When the acid value reached 6 or less, the reaction was terminated. After cooling to about 60° C., the reaction mixture was taken out of the reaction vessel and a vinyl ester resin (a1-1) with a hydroxyl value of 215 mgKOH/g was obtained.

Synthesis Example 2: Synthesis of Vinyl Ester Resin (a1-2)

Into a 2 L flask equipped with a thermometer, a nitrogen inlet tube, and a stirrer, 677 parts by mass of an epoxy resin ("EPICLON 850" produced by DIC Corporation, a bisphenol A epoxy resin, an epoxy equivalent of 188), 310 parts by mass of methacrylic acid, and 0.29 parts by mass of t-butylhydroquinone were charged, followed by heating to 90° C. under a flow of gas obtained by mixing nitrogen and air at a ratio of 1:1. Hereinto, 0.60 parts by mass of 2-methylimidazole was put, followed by heating to 110° C. and reaction for 10 hours. When the acid value reached 6 or less, the reaction was terminated. After cooling to about 60° C., the reaction mixture was taken out of the reaction vessel and a vinyl ester resin (a1-2) with a hydroxyl value of 217 mgKOH/g was obtained.

Synthesis Example 3: Synthesis of Vinyl Ester Resin (a1-3)

Into a 2 L flask equipped with a thermometer, a nitrogen inlet tube, and a stirrer, 656 parts by mass of an epoxy resin ("EPICLON 850" produced by DIC Corporation, a bisphenol A epoxy resin, an epoxy equivalent of 188), 147 parts by mass of bisphenol A, and 0.4 parts by mass of 2-methylimidazole were charged, followed by heating to 120° C., reaction for three hours, and measuring the epoxy equivalent. After it was confirmed that the epoxy equivalent reached 365 as preset and the flask was then cooled to about 60° C., 185 parts by mass of methacrylic acid and 0.29 parts by mass of t-butylhydroquinone were charged, followed by heating to 90° C. under a flow of gas obtained by nitrogen and air at a ratio of 1:1. Hereinto, 0.18 parts by mass of 2-methylimidazole was put, followed by heating to 110° C. and reaction for 10 hours. When the acid value reached 6 or less, the reaction was terminated. After cooling to about 60° C., a reaction mixture was taken out of the reaction vessel and a vinyl ester resin (a1-3) with a hydroxyl value of 209 mgKOH/g was obtained.

Example 1

Preparation of Resin Composition

A resin solution prepared by dissolving 52.1 parts by mass of the vinyl ester resin (a1-2) obtained in Synthesis Example 2 in 35.0 parts by mass of phenoxyethyl methacrylate was mixed with 22.0 parts by mass of a polyisocyanate ("Cosmonate LL" produced by Mitsui Chemicals & SKC Polyurethanes Inc., an aromatic polyisocyanate; hereinafter simply referred to as the "polyisocyanate (a3-1)), 1.2 parts by mass of a polymerization initiator ("Kayacarbon AIC-75" produced by Kayaku Akzo Co., Ltd., an organic peroxide; hereinafter simply referred to as the "polymerization initiator (a4-1)", and 0.035 parts by mass of a polymerization inhibitor (para-benzoquinone; hereinafter simply referred to as the "polymerization inhibitor (1)"), whereby a resin composition (A'-1) was obtained.

Measurement of Viscoelasticity of Thickening Substance

The resin composition (A'-1) obtained as described above was interposed between glass plates with a thickness of 3 mm using a 1.5 mm spacer and was allowed to stand in a 40° C. thermostatic unit for 20 hours, whereby a sheet-shaped thickening substance was obtained. The sheet-shaped thickening substance was cut into a 30 mmφ piece, which was tested for viscoelasticity using an MCR rheometer, "MCR 302", manufactured by Anton Paar GmbH under conditions including a 30 mmφ parallel plate, an angular frequency of 10 rad/s, a swing angle of 10%, a heating rate of 2° C./min, and a gap of 1.5 mm. From the obtained measurement results, storage modulus, loss modulus, complex viscosity, and loss tangent were obtained.

Preparation of Fiber-Reinforced Molding Material

The resin composition (A'-1) obtained as described above was applied to a laminated film of polyethylene and polypropylene so as to give an average spread of 0.5 kg/m². Carbon fibers (hereinafter simply referred to as the carbon fibers (B-1)) obtained by cutting a carbon fiber roving ("T700SC-12000-50C" manufactured by Toray Industries Inc.) to 25 mm were uniformly dropped thereon in air such that the fibers were not oriented, the thickness was uniform, and the content of the carbon fibers was 50% by mass. The carbon fibers were covered with a film similarly coated with the resin composition (A'-1) at 0.5 kg/m² such that the carbon fibers were impregnated with the resin, followed by standing in a 40° C. thermostatic unit for 20 hours, whereby a sheet-shaped fiber-reinforced molding material (1) containing a thickening substance (A-1) and the carbon fibers (B-1) was obtained. The area weight of the sheet-shaped fiber-reinforced molding material (1) was 2 kg/m².

Evaluation of Fluidity

The sheet-shaped fiber-reinforced molding material (1) obtained as described above was separated from the films and was cut into three pieces with a diameter of 150 mmφ; the three pieces were stacked and were pressed under conditions including a mold temperature of 150/140° C., a dwell time of 300 seconds, a molding pressure of 13 MPa, and a clamping rate of 5.5 mm/sec; the area was measured; the enlargement ratio from the initial state was calculated; and the fluidity was evaluated in accordance with criteria below.
  A: The enlargement ratio is 3 or more and the separation between the resin and the carbon fibers is less than 5 mm.
  B: The enlargement ratio is 3 or more and the separation between the resin and the carbon fibers is 5 mm or more, or the enlargement ratio is 2 to less than 3 and the separation between the resin and the carbon fibers is less than 10 mm.
  C: The enlargement ratio is 2 to less than 3 and the separation between the resin and the carbon fibers is 10 mm or more, or the enlargement ratio is less than 2.

Preparation of Molded Article

The sheet-shaped fiber-reinforced molding material (1) obtained as described above was separated from the films and was cut into three pieces with a size of 265 cm×265 cm. The three pieces were stacked, were set on a central section of a 30×30 cm² flat mold, and were molded at a press mold temperature of 150° C. for a pressing time of five minutes with a pressing pressure of 12 MPa, whereby a flat molded article (1) with a thickness of 3 mm was obtained.

Evaluation of Flexural Strength and Flexural Modulus

Five samples were cut from the molded article (1) obtained as described above in each of a horizontal direction and a vertical direction, were subjected to a three-point bending test in accordance with JIS K 7074, and were evaluated for flexural strength and flexural modulus in accordance with criteria below. Samples with a flexural strength of 300 MPa or more were rated "A", and samples with a flexural strength of less than 300 MPa were rated "B". Samples with a flexural modulus of 20 GPa or more were rated "A", and samples with a flexural modulus of less than 20 GPa were rated "B".

Examples 2 to 4

Resin compositions (A'-2) to (A'-4), sheet-shaped fiber-reinforced molding materials (2) to (4), and molded articles (2) to (4) were prepared and evaluated in the same manner as in Example 1 except that the blend composition was changed as shown in Table 1.

Comparative Examples 1 and 2

Resin compositions (RA'-1) and (RA'-2), sheet-shaped fiber-reinforced molding materials (R1) and (R2), and molded articles (R1) and (R2) were prepared and evaluated in the same manner as in Example 1 except that the blend composition was changed as shown in Table 1

The blend compositions and evaluation results of the fiber-reinforced molding materials (1) to (4) and (R1) and (R2) obtained as described above are shown in Table 1. .

TABLE 1

|  |  | Example 1 | Example 2 | Example 3 | Example 4 | Comparative Example 1 | Comparative Example 2 |
|---|---|---|---|---|---|---|---|
| Fiber-reinforced molding material |  | (1) | (2) | (3) | (4) | (R1) | (R2) |
| Composition | Vinyl ester (a1-1) |  |  |  |  | 55.0 | 55.0 |
|  | Vinyl ester (a1-2) | 52.1 | 51.3 | 48.1 | 44.2 |  |  |
|  | Vinyl ester (a1-3) | 12.9 | 12.7 | 11.9 | 11.0 |  |  |
|  | Phenoxyethyl methacrylate | 35.0 | 36.0 | 40.0 | 44.8 | 45.0 | 45.0 |
|  | Polyisocyanate (a3-1) | 22.0 | 21.0 | 22.0 | 21.5 | 27.0 | 12.0 |
|  | Polymerization initiator (a4-1) | 1.2 | 1.2 | 1.2 | 1.2 | 1.2 | 1.2 |
|  | Polymerization inhibitor (1) | 0.035 | 0.035 | 0.035 | 0.035 | 0.035 | 0.035 |
|  | Carbon fibers (B-1) | 123 | 122 | 123 | 123 | 128 | 113 |
| Maximum value of rate of change in viscosity of thickening substance (A) (Pa·s/° C.) (temperature region lower than temperature Xa) |  | 1,091 | 566 | 488 | 170 | 92 | 321 |
| Maximum value of rate of change in viscosity of thickening substance (A) (Pa·s/° C.) (temperature region higher than or equal to temperature Xa) |  | 5,030 | 2,277 | 3,904 | 6,105 | 3,343 | 12,320 |
| Lowest melt viscosity A of thickening substance (A) (Pa·s) |  | 26 | 14 | 47 | 115 | 1,021 | 9 |
| Temperature Xa indicating lowest melt viscosity A of thickening substance (A) (° C.) |  | 96.1 | 102.1 | 100.1 | 102.1 | 101.1 | 100.1 |
| Maximum value of Tanδ of thickening substance (A) |  | 4.1 | 4.4 | 1.3 | 1.1 | 0.7 | 1.2 |
| Evaluation | Fluidity | A | A | A | A | C | C |
|  | Flexural strength of molded article | A | A | A | A | B | B |
|  | Flexural modulus of molded article | A | A | A | A | B | B |

It was confirmed that the fiber-reinforced molding materials of Examples 1 to 4 according to the present invention were excellent in fluidity and the obtained molded articles were excellent in flexural strength and flexural modulus.

On the other hand, it was confirmed that Comparative Example 1, which was an example in which the maximum value of the rate of change in viscosity in a temperature region lower than a temperature Xa indicating the lowest melt viscosity A was less than 100 Pa·s/° C., which is the lower limit in the present invention, was poor in fluidity.

It was confirmed that Comparative Example 2, which was an example in which the maximum value of the rate of change in viscosity in a temperature region higher than or equal to the temperature Xa indicating the lowest melt viscosity A was greater than 10,000 Pa·s/° C., which is the upper limit in the present invention, was poor in fluidity.

The invention claimed is:

1. A fiber-reinforced molding material comprising a thickening substance (A) containing a vinyl ester resin (a1), an unsaturated monomer (a2), a polyisocyanate (a3), a polymerization initiator (a4), and a polymerization inhibitor as essential raw materials and carbon fibers (B) with a fiber length of 2.5 mm to 50 mm, wherein the thickening substance (A) satisfies the following conditions (1) to (3) as measured with a rheometer:
  (1) a maximum value of a rate of change in viscosity in a temperature region lower than a temperature Xa indicating a lowest melt viscosity A is 100 Pa·s/° C. to 1,500 Pa·s/° C.,
  (2) a maximum value of a rate of change in viscosity in a temperature region higher than or equal to the temperature Xa is 1,000 Pa·s/° C. to 10,000 Pa·s/° C., and
  (3) the lowest melt viscosity A is 10 Pa·s to 1,000 Pa·s and the temperature Xa is 70° C. to 140° C.

2. The fiber-reinforced molding material according to claim 1, wherein a maximum value of a loss tangent (Tan δ) of the thickening substance (A) in the temperature region lower than the temperature Xa is in the range of 0.9 to 10.

3. A molded article using the fiber-reinforced molding material according to claim 1.

4. A molded article using the fiber-reinforced molding material according to claim 2.

* * * * *